(12) United States Patent
Yamazaki

(10) Patent No.: US 7,594,807 B2
(45) Date of Patent: Sep. 29, 2009

(54) TWIN-SCREW EXTRUDER

(75) Inventor: Yasunori Yamazaki, Nagoya (JP)

(73) Assignee: NGK Insulators, Inc, Nagoya (JP)

( * ) Notice: Subject to any disclaimer, the term of this patent is extended or adjusted under 35 U.S.C. 154(b) by 0 days.

(21) Appl. No.: 11/865,356

(22) Filed: Oct. 1, 2007

(65) Prior Publication Data
US 2008/0102146 A1 May 1, 2008

(30) Foreign Application Priority Data
Nov. 1, 2006 (JP) .............................. 2006-297763

(51) Int. Cl.
B29C 47/40 (2006.01)
B29C 47/68 (2006.01)

(52) U.S. Cl. .................. 425/197; 425/199; 425/204; 425/380; 425/382.4; 425/461

(58) Field of Classification Search ................ 425/197, 425/198, 199, 204, 380, 382.4, 461, 467
See application file for complete search history.

(56) References Cited

U.S. PATENT DOCUMENTS 2,771,636 A * 11/1956 McLntosh et al. ........... 425/185
3,941,544 A * 3/1976 Barth ...................... 425/376.1
3,986,816 A * 10/1976 Gwinn et al. ............... 425/188
4,364,888 A * 12/1982 Levin .................... 264/177.12
4,395,212 A * 7/1983 Lambertus .................. 425/185

\* cited by examiner

Primary Examiner—Robert B Davis
Assistant Examiner—Joseph Leyson
(74) Attorney, Agent, or Firm—Oliff & Berridge, PLC

(57) ABSTRACT

In a twin-screw extruder including a barrel, which has two screws disposed in parallel in its inside and an opening at one edge, and an extrusion molding die disposed to the opening side of the barrel through a straightening vane and a filter net, the straightening vane includes a first straightening vane and a second straightening vane, the first one has a hole forming region having plural through holes formed in a region whose size and shape are in agreement with the size and the shape of the inner periphery of the opening portion, and the second one has a hole structure whose size and shape of its inner periphery at one opening edge are in agreement with the size and the shape of the hole forming region, and its sectional area is reduced once in a process to the other opening edge and then expanded in a taper shape.

1 Claim, 5 Drawing Sheets

TWIN-SCREW EXTRUDER

BACKGROUND OF THE INVENTION

1. Field of the Invention

The present invention relates to a twin-screw extruder used to extrusion molding of a honeycomb formed body and the like.

2. Description of the Related Art

A honeycomb-like structure (honeycomb structure) is widely used as a carrier for purifying exhaust gases from various internal combustion engines such automobile engines, a catalyst carrier for deodorization, a filter for various filtering equipment, a heat exchanger unit, and a carrier for a chemical reaction equipment such as a catalyst carrier of a reforming catalyst of a fuel cell battery, and the like. Ordinarily, the honeycomb structure is manufactured by obtaining a formed body (honeycomb formed body) having a predetermined honeycomb structure by extrusion molding clay composed of a ceramic material and the like and drying and baking the formed body.

Conventionally, a twin-screw extruder 21 having a structure as shown in FIG. 4 is widely used as an apparatus for obtaining the honeycomb, formed body. The twin-screw extruder 21 has two screws 7 disposed in parallel in the inside thereof and further includes a barrel 2 having an opening 3 to an end and a extrusion molding die 9 disposed to the opening 3 side of the barrel 2 through a straightening vane 22 and a filter net 8. FIG. 5A and FIG. 5B are a front elevational view of the straightening vane 22 and a sectional view thereof in a thickness direction. As shown in these figures, the straightening vane 22 has one through hole 23 formed thereto, and the through hole 23 acts as a flow path of the clay extruded from the opening 3 of the barrel 2. The through hole 23 is ordinarily a circular hole having a diameter of about 8 to 36 mm (note that no prior art document is found as to a technology relating to the straightening vane structure). The filter net (screen) 8 is used to remove coarse grains and foreign substances in the clay and disposed upstream of the die 9 in the flow direction of the clay. The die 9 has slits formed thereto corresponding to the sizes of the through holes and the partitions of a honeycomb formed body to be obtained.

A forming material charged into the inside of the barrel 2 through a material charge hopper 10 which is communicating inside of the barrel 2 with outside of the barrel 2 is knead by the two screws 7 driven by a driving unit 11 composed of a motor, a gear box, and the like while being applied with shear force. Thereafter, the forming material is continuously extruded to the outside of the barrel 2 as clay from the opening 3 disposed to the end of the barrel 2. Thus extruded clay flows into the through hole 23 of the straightening vane 22 disposed in intimate contact with the opening 3 of the barrel 2, extruded from the side edge of the through hole 23 on the outlet side thereof into a space 15 between the straightening vane 22 and the filter net 8. After the inside of the space 15 is approximately filled with the clay, the clay passes through the filter net 8, moves into a space 16 between the filter net 8 and the die 9. After the inside of the space 16 is approximately filled with the clay, it is forced into the slits formed to the die 9 from the edge face of the die 9 on the inlet side thereof and extruded from the edge face of the die 9 on the outlet side thereof while being formed to a predetermined shape.

Incidentally, in conventional twin-screw extruder, when the amount of extrusion per unit time of the formed body (the amount of clay supplied to the die) changes, the formed body is liable to be deformed. As a result, a formed body must be made by extruding a constant amount of clay at all times, and thus it is difficult to carry out production by appropriately flexibly changing the amount to clay to be extruded.

An object of the present invention, which was made in view of the conventional circumstances, is to provide a twin-screw extruder for manufacturing a formed body which is unlike to be deformed even if the amount of the formed body to be extruded per unit time changes.

SUMMARY OF THE INVENTION

According to the present invention, to achieve the above object, there is provided a twin-screw extruder including a barrel, which has two screws disposed in parallel in the inside thereof and an opening at one edge, and an extrusion molding die disposed to the opening side of the barrel through a straightening vane and a filter net. In the twin-screw extruder, the straightening vane includes a first straightening vane and a second straightening vane, the first straightening vane has a hole forming region in which a plurality of through holes are formed in a region whose size and shape are in agreement with the size and the shape of the inner periphery of the opening, and the second straightening vane has one through hole having such a hole structure the size and the shape of the inner periphery thereof at one opening edge are in agreement with the size and the shape of the hole forming region and the sectional area thereof is reduced once in a process to the other opening edge and then expanded in a taper shape.

When a formed body is extrusion molded using the twin-screw extruder of the present invention, even if the amount of the formed body to be extruded per unit time changes, the formed body is unlike to be deformed, and production can be carried out while changing the amount of extrusion appropriately flexibly.

DESCRIPTION OF THE PREFERRED EMBODIMENTS

Although a typical embodiment of the present invention will be specifically explained below referring to the figures, the present invention is by no means limited to the embodiment and it should be understood that the design of the embodiment is subjected to an appropriate change, improvement and the like based on the ordinary knowledge of the person skilled in the art within the scope which does not depart from the gist of the present invention.

Figure 1:
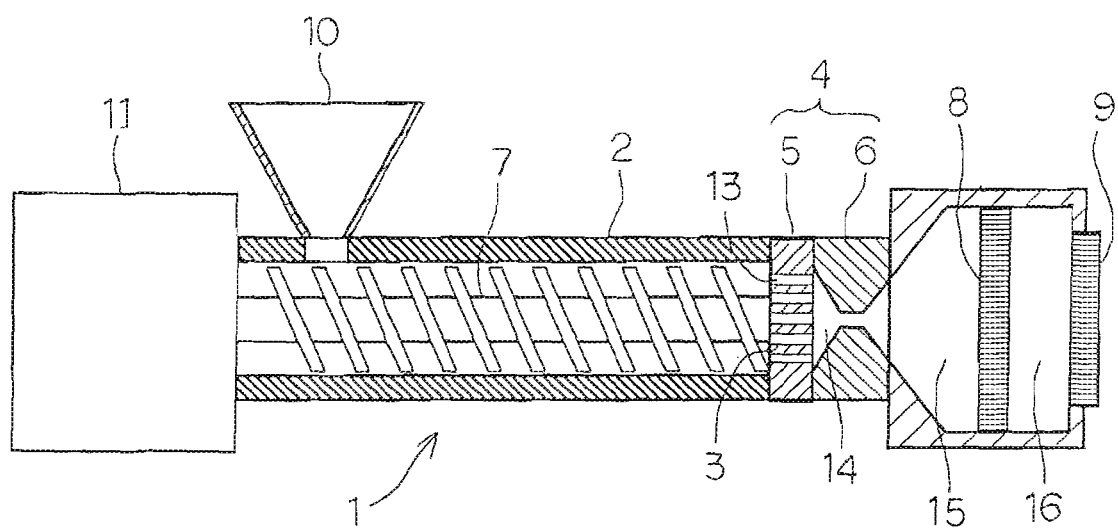
FIG. 1 is a schematic sectional view showing an example of a structure of a twin-screw extruder according to the present invention.

FIG. 1 is a schematic sectional view showing an example of a structure of a twin-screw extruder according to the present invention. The twin-screw extruder 1 includes a barrel 2 and an extrusion molding die 9. The barrel 2 has two screws 7 disposed in parallel in the inside thereof and an opening 3 formed to an end thereof, and the die 9 is disposed to the opening 3 side of the barrel 2 through a straightening vane 4 and a filter net 8. The straightening vane 4 is composed of a first straightening vane 5 and a second straightening vane 6.

Figure 2A:
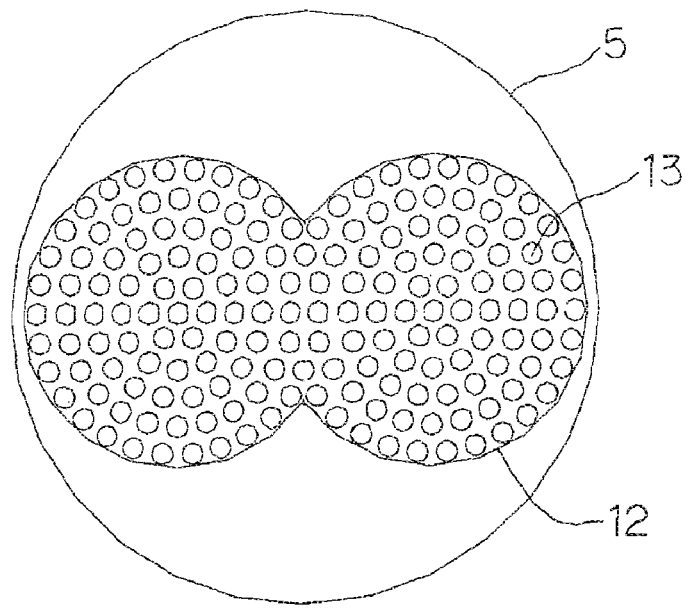
FIG. 2A is a plan view of a first straightening vane.
Figure 2B:
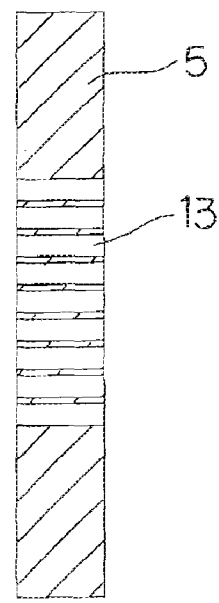
FIG. 2B is a sectional view of the first straightening vane.

FIG. 2A and FIG. 2B are a front elevational view and a sectional view in thickness direction of the first straightening vane 5. The first straightening vane 5 has a hole forming region 12 in which a plurality of through holes 13 are formed in a region whose size and shape are in agreement with the size and the shape of the inner periphery of the opening 3 of the barrel 2. Ordinarily, the inner periphery of the opening of the barrel in the twin-screw extruder has a gourd shape formed by coupling two circles which have the same diameter and are partly overlapped with each other. The centers of the two circles are in agreement with the axes of the two screws in the barrel, respectively. As described above, the hole forming region 12 in the first straightening vane 5 is the region whose size and shape are in agreement with the size and the shape of the inner periphery of the opening 3 of the barrel 2. The first straightening vane 5 is disposed in intimate contact with the opening 3 of the barrel 2 such that the hole forming region 12 on the one surface thereof overlaps the inner periphery of the opening 3.

Figure 3A:
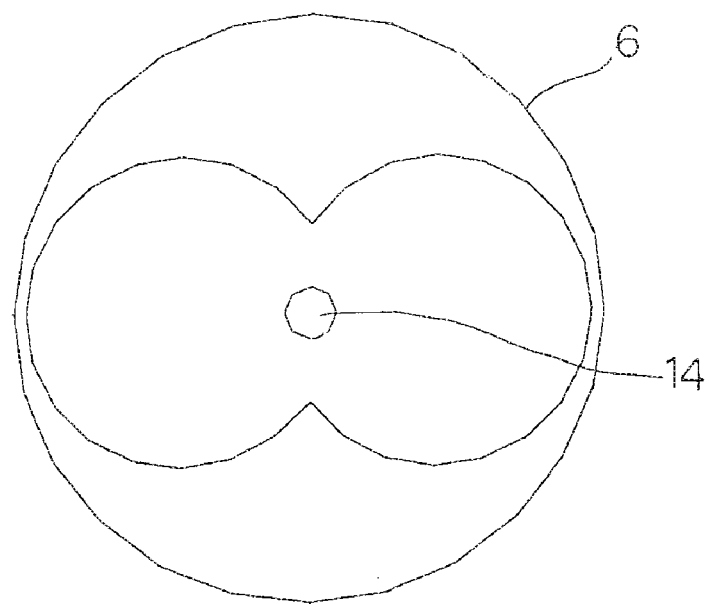
FIG. 3A is a plan view of a second straightening vane.
Figure 3B:
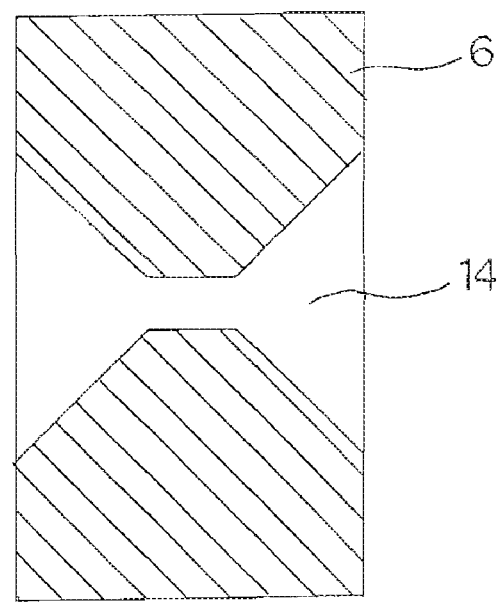
FIG. 3B is a sectional view of the second straightening vane.

FIG. 3A and FIG. 3B are a front elevation a view and a sectional view in thickness direction of the second straightening vane 6. The second straightening vane 6 has such a hole structure that the size and the shape of the inner periphery thereof at one opening edge are in agreement with the size and the shape of the hole forming region 12 of the first straightening vane 5 and the sectional area thereof is reduced once in a process to the other opening edge and then expanded in a taper shape. The second straightening vane 6 is disposed in intimate contact with the first straightening vane 5 in such a manner that the one opening edge in the through hole 14 overlaps a hole forming region (the hole forming region on the surface opposite to the surface in intimate contact with the opening of the barrel) 12 of the first straightening vane 5.

The filter net (screen) 8 is disposed upstream of the die 9 in the flow direction of clay. The filter net 8 is used to remove coarse grains and foreign substances in the clay, and, for example, a SUS304 net having a mesh of about 65 to 420 μs, and the like are preferably used as the filter net 8. Slits are formed to the die 9 in correspondence to the size of the through holes and the partitions of the honeycomb formed body to be obtained. The filter net 8 is preferably disposed at a certain interval from the second straightening vane 6, and further the die 9 is preferably disposed at a certain interval from the filter net 8.

A forming material charged into the inside of the barrel 2 through a material charge hopper 10 which is communicating inside of the barrel 2 with outside of the barrel 2 is knead by the two screws 7 driven by a driving unit 11 composed of a motor, a gear box, and the like while being applied with shear force. Thereafter, the forming material is continuously extruded to the outside of the barrel 2 as clay from the opening 3 disposed to the edge of the barrel 2. The clay extruded to the outside of the barrel 2 as described above flows into a multiplicity of through holes 13 of the first straightening vane 5 disposed in intimate contact with the opening 3 of the barrel 2 and extruded in a noodle state. Thereafter, the clays enter one through hole 14 of the second straightening vane 6 and bundled as one piece of clay, extruded between a space 15 between the second straightening vane 6 and the filter net 8. After the inside of the space 15 is approximately filled with the clay, the clay passes through the filter net 8, moves to a space 16 between the filter net 8 and the die 9. After the inside of the space 16 is approximately filled with the clay, it is forced into the slits formed to the die 9 from the edge face of the die 9 on the inlet side thereof and extruded from the edge face of the die 9 on the outlet side thereof while being formed to a predetermined shape.

In the twin-screw extruder 1 of the present invention, the clay extruded from the barrel 2 is dispersed to a multiplicity of noodle-like flows by the first straightening vane 5 constituting a former stage of the straightening vane 4 as described above. Thereafter, the multiplicity of noodle-like flows of the clay are narrowed down and bundled to one uniform flow by the second straightening vane 6 constituting a latter stage of the straightening vane 4 and supplied to the die 9 through the filter net 8. A formed body is unlike to be deformed even if the amount of the formed body to be extruded is changed by employing the straightening vane structure as described above.

In the first straightening vane 5, although the diameter and the disposition pitch of the through holes 13 are not particularly limited, the diameter is preferably set to about 5 to 10 mm, and the disposition pitch is preferably set to about 6 to 15 mm. When the diameter is set to less than 5 mm, a resistance may increased when the clay passes through the through holes 13 and the amount of extrusion may be suppressed, whereas when the diameter exceeds 10 mm, shear force may not be sufficiently applied to the clay.

It is preferable to set the diameter of the through hole 14 of the second straightening vane 6 to about 12 to 40 mm in the portion thereof having a smallest sectional area. When the diameter is set to less than 12 mm, a resistance may increased when the clay passes through the through hole 14 and the amount of extrusion may be suppressed, whereas when the diameter exceeds 40 mm, the flow of the clay, which passes through the through holes 13 of the first straightening vane 5 and dispersed to the multiplicity of noodle-like flows once cannot be sufficiently narrowed down and bundled and thus the clay may be made to a biased flow.

A structure of a conventional twin-screw extruder can be basically employed as it is as the structure of twin-screw extruder of the present invention except the straightening vanes described above. In the twin-screw extruder of the present invention, the two screws in the barrel may be rotated any of the same direction and a different direction.

Although the shape of the formed body formed by the twin-screw extruder of the present invention is not particularly limited a long as it is a shape obtained by extrusion molding, the twin-screw extruder is preferable to form, for example, a honeycomb formed body which is liable to be deformed because it employ thin partitions to partition cells.

EXAMPLE

Although the present invention is explained in more detail based on an example described below, the present invention is by no means limited thereto.

Columnar honeycomb formed bodies (diameter: 102 mm, width: 120 mm, partition thickness: 75 μm, cell shape: square, cell density: 600 cells/square inch) were extrusion molded by using the twin-screw extruder of the present invention having the structure shown in FIG. 1 and charging a mixture of 96 kg containing a ceramics material of 70 kg (talc, kaolin, calcined kaolin, alumina, aluminum hydroxide, and silica), water of 21 kg, and a binder of 5 kg as a forming material to the twin-screw extruder in the respective amounts of extrusion of 130 kg/h, 200 kg/h, and 260 kg/h. Note that the diameter of the through holes of the first straightening vane was set to 5 mm and the disposing pitch of the through hole was set to 6.5 mm. Further, the diameter of the through hole of the second straightening vane was set to 12 mm in the portion thereof having the smallest sectional area. The maximum diameters and the minimum diameters of honeycomb formed bodies formed in the respective amounts of extrusion were measured in the one edge faces and the other faces thereof, respectively, and the roundnesses (=maximum diameter−minimum diameter) in the respective edge faces were determined from the differences between the diameters. Table 1 shows a result of determination.

COMPARATIVE EXAMPLE

Figure 4:
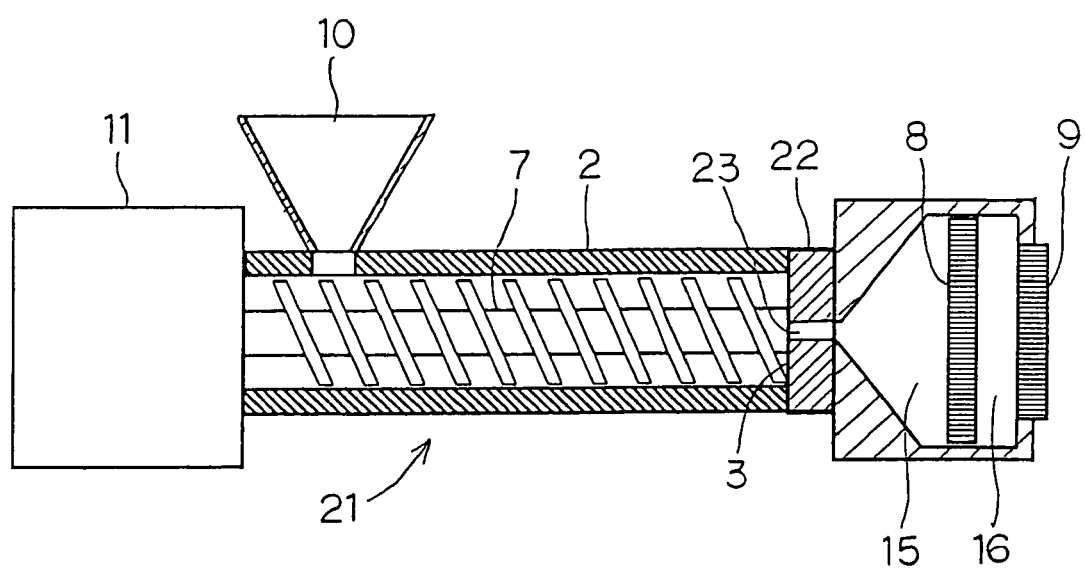
FIG. 4 is a schematic sectional view showing a structure of a conventional twin-screw extruder.
Figure 5A:
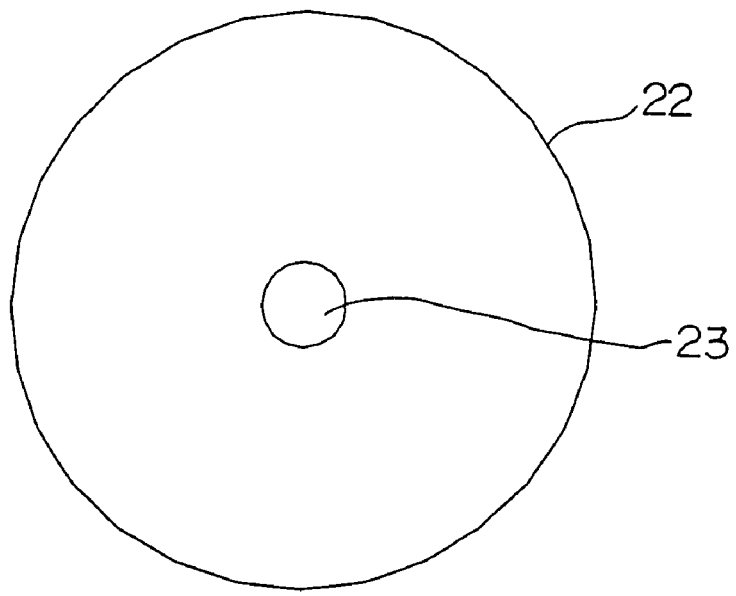
FIG. 5A is a plan view of a straightening vane.
Figure 5B:
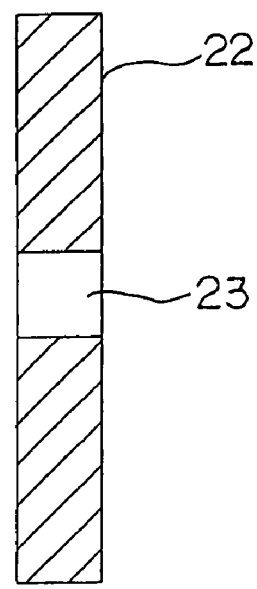
FIG. 5B is a sectional view of the straightening vane.

Honeycomb formed bodies were extrusion molded in the same way as the example except that the conventional twin-screw extruder having the structure shown in FIG. 4 was used, and the roundnesses thereof were determined likewise. Table 1 shows a result of determination.

TABLE 1

| Amount of Extrusion of Honeycomb (kg/h) | | | 130 | 200 | 260 |
|---|---|---|---|---|---|
| Roundness (mm) | Example | One Edge Face | 0.97 | 0.78 | 1.06 |
| | | Other Edge Face | 1.68 | 1.09 | 1.39 |
| | | Average | 1.27 | 0.92 | 1.31 |
| | Comparative Example | One Edge Face | 1.51 | 1.29 | 1.83 |
| | | Other Edge Face | 2.62 | 3.93 | 3.84 |
| | | Average | 2.26 | 3.23 | 1.84 |

Note that the diameter of the through hole of the straightening vane was set to 24 mm.

As shown in Table 1, in the comparative example using the conventional twin-screw extruder, the roundnesses of the honeycomb formed bodies are greatly changed at the edge faces thereof due to the change of the amounts of extrusion as well as the roundnesses have large differences between one edge faces and the other edge faces, and further the roundnesses have large values. In contrast, in the example using the twin-screw extruder of the present invention, even if the amounts of extrusion change, the roundnesses of the edge faces of the honeycomb formed bodies are not so greatly changed, and the differences between the roundnesses of the one edge faces and the other faces and the values of the roundnesses are small as compared with those of the comparative example.

The twin-screw extruder of the present invention can be preferably applied to form a formed body that can be formed by extrusion molding such as a honeycomb formed body and the like.

What is claimed is:

1. A twin-screw extruder comprising:
a barrel, which has two screws disposed in parallel in the inside thereof and an opening at one edge, each of the two screws extending along an axis of each screw; and
an extrusion molding die disposed to the opening side of the barrel through a straightening vane and a filter net, wherein:
the straightening vane comprises a first straightening vane and a second straightening vane,
the first straightening vane has a hole forming region in which a plurality of through holes are formed in a region whose size and shape are in agreement with the size and the shape of the inner periphery of the opening, the hole forming region having a gourd shape formed by coupling two circles having the same diameter and being partly overlapped with each other, the two circles being in a plane substantially perpendicular to the axes of the two screws and having respective centers, each center located at a point in the plane where the axis of a screw intercepts the plane, and
the second straightening vane has such a hole structure that the size and the shape of the inner periphery thereof at one opening edge are in agreement with the size and the shape of the hole forming region and the sectional area thereof is reduced once in a process to the other opening edge and then expanded in a taper shape.

* * * * *